(12) United States Patent
Kashiyama

(10) Patent No.: US 7,102,681 B1
(45) Date of Patent: Sep. 5, 2006

(54) FOCUS DETECTING APPARATUS

(75) Inventor: Ritsuo Kashiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/541,614

(22) Filed: Apr. 3, 2000

(30) Foreign Application Priority Data

Apr. 6, 1999 (JP) ................................. 11-098410

(51) Int. Cl.
*H04N 5/232* (2006.01)

(52) U.S. Cl. ...................... 348/353; 348/297; 348/345; 348/348; 348/349; 348/356; 396/121; 396/123

(58) Field of Classification Search ................ 348/345, 348/348, 297, 353, 349, 356; 396/121, 123; 356/4.03, 4.04
See application file for complete search history.

(56) References Cited

U.S. PATENT DOCUMENTS

| | | | | |
|---|---|---|---|---|
| 4,782,396 A | * | 11/1988 | Park ........................... | 348/353 |
| 4,992,817 A | * | 2/1991 | Aoyama et al. .............. | 396/96 |
| 5,361,095 A | * | 11/1994 | Toshinobu et al. .......... | 348/354 |
| 5,369,436 A | * | 11/1994 | Kawakami et al. ......... | 348/355 |
| 5,486,860 A | * | 1/1996 | Shiokawa et al. .......... | 348/354 |
| 5,758,210 A | * | 5/1998 | Hamada et al. ............. | 396/121 |
| 5,822,627 A | * | 10/1998 | Moriyama ................... | 396/121 |
| 5,905,919 A | * | 5/1999 | Ide .............................. | 396/121 |
| 6,172,375 B1 | * | 1/2001 | Kindaichi .............. | 250/559.38 |
| 6,229,568 B1 | * | 5/2001 | Kawaguchi et al. ........ | 348/350 |
| 6,791,617 B1 | * | 9/2004 | Nakamura ................... | 348/345 |

FOREIGN PATENT DOCUMENTS

JP  1-222583  9/1989

* cited by examiner

*Primary Examiner*—Tuan Ho
*Assistant Examiner*—Chriss S. Yoder
(74) *Attorney, Agent, or Firm*—Fitzpatrick, Cella, Harper & Scinto

(57) ABSTRACT

In a focus detection apparatus, an accumulation-type sensor formed of a plurality of sensor cells accumulates an image signal, and a component of the image signal is read from each cell for a focus detection calculation. A signal is read from a part of the cells in the sensor, and it is determined from the signal whether an image signal has a low contrast. When it is determined that the image signal has a low contrast, reading signals from the other cells is disabled to omit unnecessary signal reading operations.

1 Claim, 11 Drawing Sheets

FOCUS DETECTING APPARATUS

BACKGROUND OF THE INVENTION

1. Field of the Invention

The present invention relates to an improvement of a focus or distance detecting apparatus mounted on single-lens reflex cameras.

2. Description of the Related Art

Japanese Unexamined Patent Publication No. Hei-1-222583 discloses that the accumulating operation of an accumulation-type sensor used for detecting a focus is controlled such that the maximum and minimum values of an accumulation signal are detected while a photoelectric conversion cell performs an accumulating operation, and the accumulating operation is terminated when the difference between the maximum and minimum values reaches a predetermined level, in order to obtain a clear image signal even from a low-contrast object.

Cameras have been developed in each of which a passive-type focus detecting apparatus employing a sensor that operates in the above-discussed accumulation control method is used to perform focus detection at a plurality of focus detection areas and to automatically select the best focus point among the plurality of detected focuses to bring the camera into focus.

In the above-discussed conventional accumulation control method, when an object has a high luminance with a low contrast, if the maximum value of an accumulation signal reaches a predetermined level, even if the difference between the maximum and minimum values of the accumulation signal has not yet reached a predetermined value, the accumulating operation is terminated so that the accumulation signal of a photoelectric conversion cell is not saturated. When an object has a low luminance, since signal accumulation at a photoelectric conversion cell takes a long time and the dark current of the photoelectric conversion cell greatly affects, the accumulation time is limited to a predetermined time and the accumulating operation is terminated even if the difference between the maximum and minimum values of the accumulation signal has not yet reached a predetermined value.

To determine a focus detection area, from which information is obtained so that a camera is automatically brought into focus among a plurality of focus detection areas, focus detection is performed at all focus detection areas and a focus detection area is determined from various points such as the position of the focus and the characteristics of an image signal obtained when the focus is detected. Focus detection areas generating low-contrast image signals are not used because they do not satisfy the determination standard of the characteristics of image signals.

Since a focus detection area is determined from the contrast of image signals and other data after image signals are read from all of a plurality of focus detection areas, unnecessary reading is performed at focus detection areas having low contrasts and actually not used, including areas where a sufficient signal level is not obtained from an accumulation-type sensor in cases when an object has a high luminance with a low contrast and when an object has a low luminance with a low contrast.

SUMMARY OF THE INVENTION

Accordingly, it is an object of the present invention to provide a focus or distance detecting apparatus which eliminates unnecessary reading of an image signal and which allows the time required for detecting the focus or a distance to be made shorter.

According to one aspect, the present invention which achieves these objectives relates to a focusing-information detecting apparatus for executing a focusing calculation according to an image signal sent from a sensor block formed of a plurality of cell units which accumulate image signal components. The apparatus comprises a characteristic determination circuit for reading a signal from a first set of the plurality of cell units in the sensor block and for determining the characteristics of the corresponding image signal. The apparatus also comprises a reading processing circuit for applying signal reading processing at least to other cell units not included in the first set in the sensor block when the determination result obtained by the characteristic determination circuit is a predetermined result, and for disabling signal reading processing at least for the other cell units in the sensor block when the determination result obtained by the characteristic determination circuit is another predetermined result, which is different from the predetermined result. In one embodiment, a microcomputer can comprise these two circuits.

The apparatus of this embodiment can further comprise a control circuit for controlling an operation for accumulating image signal components in the sensor block so that the characteristic determination circuit is operated after the accumulation operation controlled by the control circuit is finished. A microcomputer can comprise the control circuit. In addition, the first set of the cell units can output a signal indicating the luminance or the contrast received by the sensor block.

According to another aspect, the present invention that can achieve these objectives relates to a detecting apparatus for detecting a focus state or distance information according to an image signal accumulated by each of image-signal accumulation sensor blocks corresponding to a plurality of focus or distance detection areas. The apparatus comprises a reading circuit for reading, every time an operation for accumulating image signal components is finished in a sensor block, the image signal from the sensor block where the accumulation operation has been finished. The apparatus also comprises a reading control circuit for executing, during the reading operation, a first reading processing operation for reading the characteristic signal of the image signal in a sensor block to which the reading operation is applied, and for executing a second reading processing operation for reading the image signal from the sensor block whose characteristic signal was subject to the first reading processing operation after the first reading processing operation. The apparatus further comprises a determination circuit for evaluating the characteristic signal read in the first reading processing operation and for determining whether the second reading processing is executed. The apparatus also includes a circuit for detecting the focus state or distance information according to an image signal accumulated by each of image-signal accumulation sensor blocks corresponding to a plurality of focus or distance detection areas, and according to the image signal reading performed by the reading circuit. In one embodiment, a microcomputer comprises each of these circuits. In addition, the determination circuit can disable the second reading processing operation when the characteristic signal indicates that the image signal is inappropriate for focus or distance detection.

According to another aspect, the present invention that achieves these objectives relates to a detecting apparatus for calculating focus detection information or distance information according to an image signal accumulated in each of image-signal accumulation sensor blocks corresponding to a plurality of focus or distance detection areas. The apparatus comprises a first output circuit for outputting the characteristic signal of a photoelectrically converted image signal in each focus or distance detection area, a second output circuit for outputting the photoelectrically converted image signal in each focus or distance detection area, a first signal reading circuit for reading the characteristic signal from the first output circuit, a second signal reading circuit for reading the image signal from the second output circuit, and a reading control circuit for comparing the level of the characteristic signal read by the first signal reading circuit with a determination level determined in advance, for controlling the second signal reading circuit to read the image signal in a focus or distance detection area where the level of the characteristic signal has a first relationship with the determination level, and for disabling reading of the image signal by the second signal reading circuit in a focus or distance detection area where the level of the characteristic signal has a second relationship with the determination level. In addition, the apparatus comprises a focus calculating circuit for calculating focus detection information or distance information according to an image signal accumulated in each of image-signal accumulation sensor blocks corresponding to a plurality of focus or distance detection areas. In one embodiment, a microcomputer can comprise each of these circuits.

In addition, this embodiment can further comprise a determination-level changing circuit for determining whether focus or distance detection has succeeded in a focus or distance detection area among the plurality of focus or distance detection areas, and, when focus or distance detection has succeeded in a focus or distance detection area, for changing the determination level according to the level of a characteristic signal in the focus or distance detection area. A microcomputer can comprise such a circuit.

In addition, the apparatus can comprise a level changing circuit for determining whether focus or distance detection has succeeded in a focus or distance detection area among the plurality of focus or distance detection areas, and for changing the determination level between a case in which focus or distance detection has succeeded in a focus or distance detection area and a case in which it has not succeeded. The apparatus can also comprise a determination circuit for determining whether focus or distance detection has already succeeded in a focus or distance detection area among the plurality of focus or distance detection areas, and, only when focus or distance detection has succeeded in a focus or distance detection area, for determining whether reading is performed with the determination level. In addition, the characteristic signal of the photoelectrically converted image signal is a signal indicating the difference between the maximum value and the minimum value of the photoelectrically converted image signal. A microcomputer can comprise each of these circuits.

According to another aspect, the present invention that achieves these objectives relates to a detecting apparatus for calculating focus or distance detection information from an image signal accumulated in each of image-signal accumulation sensor blocks corresponding to a plurality of focus or distance detection areas. The apparatus comprises a focus detecting sensor comprising a difference output section for outputting the difference between the maximum value and the minimum value of a photoelectrically converted image signal in each focus or distance detection area, an image-signal output section for outputting the photoelectrically converted image signal in each focus or distance detection area, and a signal reading section for reading signals from the difference output section and the image-signal output section. The apparatus also comprises a reading control circuit for reading the difference output from the difference output section through the signal reading section, for reading the image signal output from the image-signal output section through the signal reading section in a focus or distance detection area where the difference is greater than a predetermined value, and for disabling reading of the image signal in a focus or distance detection area where the difference is smaller than the predetermined value. In addition, the apparatus also comprises a calculation circuit for calculating focus or distance detection information according to the read image signal. A microcomputer can comprise each of these circuits.

This embodiment can further comprise a changing circuit for determining whether focus or distance detection has already succeeded in a focus or distance detection area among the plurality of focus or distance detection areas, and, when focus or distance detection has succeeded in a focus or distance detection area, for changing the predetermined value according to the value of the characteristic signal in the focus or distance detection area. In addition, the apparatus can also comprise a changing circuit for determining whether focus or distance detection has already succeeded in a focus or distance detection area among the plurality of focus or distance detection areas, and for changing the determination value between a case in which focus or distance detection has succeeded in a focus or distance detection area and a case in which it has not succeeded. Also, the apparatus can comprise a determination circuit for determining whether focus or distance detection has already succeeded in a focus or distance detection area among the plurality of focus or distance detection areas, and, only when focus or distance detection has succeeded in a focus or distance detection area, for determining whether reading is performed with the difference being greater than the predetermined value. A microcomputer can comprise each of these circuits.

According to another aspect, the present invention that achieves these objectives relates to a detecting apparatus for calculating focus or distance detection information from an image signal accumulated in each of image-signal accumulation sensor blocks corresponding to a plurality of focus or distance detection areas. The apparatus comprises a focus detecting sensor comprising a maximum-value output section for outputting the maximum value of a photoelectrically converted image signal in each focus or distance detection area, a minimum-value output section for outputting the minimum value of the photoelectrically converted image signal in each focus or distance detection area, an image-signal output section for outputting the photoelectrically converted image signal in each focus or distance detection area, and a signal reading section for reading a signal from the maximum-value output section, from the minimum-value output section, and the image-signal output section. The apparatus also comprises a reading control circuit for reading the maximum value and the minimum value of the image signal through the signal reading section, for calculating the difference therebetween, for reading the image signal through the signal reading section in a focus or distance detection area where the difference is greater than a predetermined value, and for disabling reading of the image signal in a focus or distance detection area where the difference is smaller than the predetermined value. In addition, the apparatus comprises a calculation circuit for calculating focus or distance detection information according to the read image signal. A microcomputer can comprise each of these circuits.

According to another aspect, the present invention that achieves these objectives relates to a focusing-information detecting apparatus having a plurality of sensor blocks each formed of a plurality of cell units which accumulate image signal components, for executing, every time an operation for accumulating image signal components is finished in a sensor block, a focusing calculation according to an image signal read from the sensor block where the accumulation operation has been finished. The apparatus comprises a characteristic determination circuit for reading a signal from a first set of cell units in a sensor block where accumulation has been finished and for determining the characteristics of the corresponding image signal. The apparatus also comprises a reading processing circuit for applying signal reading processing at least to the other cell units not included in the first set of cell units in the sensor block when the determination result obtained by the characteristic determination circuit is a predetermined result, and for disabling signal reading processing at least for the other cell units in the sensor block when the determination result obtained by the characteristic determination circuit is another predetermined result, which is different from the predetermined result. The apparatus also comprises means for executing, every time an operation for accumulating image signal components is finished in a sensor block, a focusing calculation according to an image signal read from the sensor block where the accumulation operation has been finished and in accordance with the reading and determining by the characteristic determination circuit and the reading signal processing performed by the reading processing circuit. A microcomputer can comprise each of these circuits.

This embodiment can also comprise a changing circuit for changing, when the signal reading processing is applied at least to the other cell units in the sensor block if the determination result obtained by the characteristic determination circuit is the predetermined result, the determination threshold of the characteristic determination circuit, applied to signals read from the other sensor blocks. In addition, the first set of cell units output a signal indicating the luminance or the contrast received by the sensor block.

Other objects of the present invention will become clearer by the following description of embodiments explained by referring to the drawings.

DESCRIPTION OF THE PREFERRED EMBODIMENTS

Figure 1:
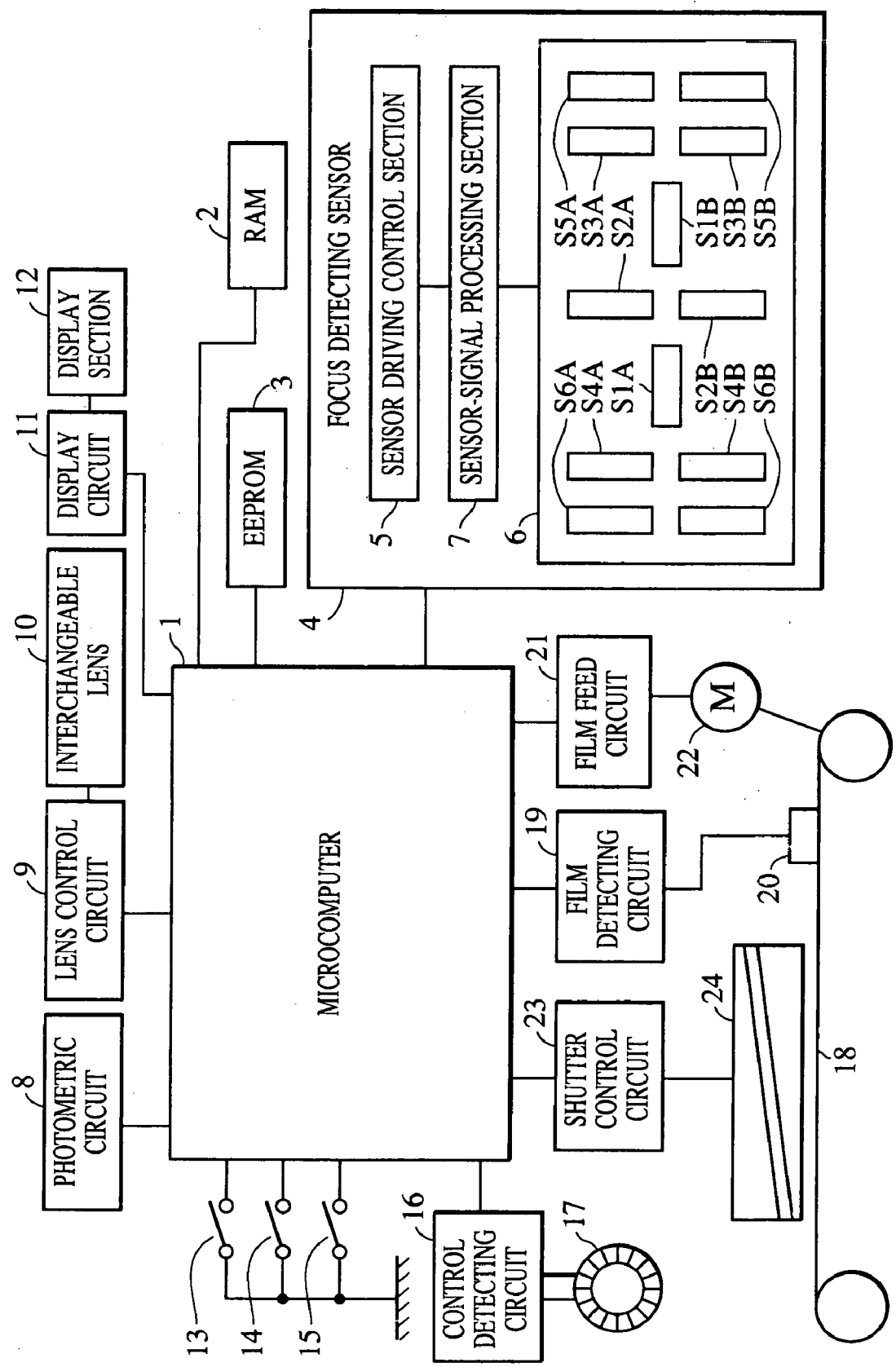
FIG. 1 is a block diagram showing the structure of the electronic components of a camera according to each embodiment of the present invention.

Embodiments of the present invention will be described below in detail by referring to the drawings.

First Embodiment

FIG. 1 is a block diagram showing the electrical structure of a camera according to the present invention. In FIG. 1, a microcomputer 1 controls the entire camera, and is provided externally or internally with a RAM 2 serving as memory means and an EEPROM 3 serving as non-volatile memory means. A focus detecting sensor 4 used for performing automatic focusing is connected to the microcomputer 1. In the focus detecting sensor 4, a sensor driving control section 5, a sensor section 6 which is controlled by the sensor driving control section 5, and a sensor-signal processing section 7 for applying signal processing to a signal accumulated by the sensor section 6, according to a signal sent from the sensor driving control section 5 and for outputting the result to the microcomputer 1 are provided. The sensor section 6 includes six line pairs of focus detecting sensor cell blocks (detection areas are hereinafter called AF (autofocus) areas), S1A and S1B, S2A and S2B, S3A and S3B, S4A and S4B, S5A and S5B, and S6A and S6B, each block being formed of a plurality of sensor cell units. Among them, the pair of sensor cell blocks S1A and S1B and the pair of sensor cell blocks S2A and S2B are disposed perpendicularly to each other to allow vertical and horizontal focus detection at one AF area. The remaining four line pairs of focus detecting sensor cell blocks each allow vertical focus detection at one AF area. Therefore, as shown in FIG. 1, the focus detecting sensor 4 has the six line pairs of focus detecting sensor cell blocks and five AF areas.

A photometric circuit 8 for measuring the luminance of an object is connected to the microcomputer 1. A lens control circuit 9 for controlling the internal electronic circuit of an interchangeable lens 10 mounted to the camera body is also connected to the microcomputer 1. The interchangeable lens 10 is connected to the lens control circuit 9 and includes an electronic circuit which controls the lens according to a control signal sent from the lens control circuit 9. A display circuit 11 for displaying various camera settings, such as a shutter speed and an aperture, and a camera state is also connected to the microcomputer 1. A display section 12 for indicating various types of data is connected to the display circuit 11.

A switch 13 (SW1) is connected to the microcomputer 1 and starts photometric measurement and focus detection. A switch 14 (SW2) is also connected to the microcomputer 1 and starts exposure. The switches SW1 and SW2 form a two-stage release switch. The switch SW1 is set ON at a first stroke of the release switch and the switches SW1 and SW2 are set ON at a second stroke thereof.

An AF-area selection switch 15 is also connected to the microcomputer 1 and is used to select any one of the AF areas provided for the focus detecting sensor 4. A control detecting circuit 16 is connected to the microcomputer 1 and is used to detect the operation of a control 17 provided for the camera for controlling various settings. The control 17 is connected to the control detecting circuit 16. With the AF-area selection switch 15 and the control 17, an AF area can be selected or an automatic AF-area selection function in which the camera automatically selects an AF area can be selected.

Film 18 is mounted to the camera body (not shown). There are also provided a film detecting circuit 19 controlled by the microcomputer 1 and detecting the position of the film 18, a photosensor 20 driven by the film detecting circuit 19 and detecting the position of the film 18, and a film feed circuit 21 controlled by the microcomputer 1 and controlling winding and rewinding of the film 18 by driving a film feed motor (M) 22. A shutter control circuit 23 controlled by the microcomputer 1 and controlling a shutter 24 for exposure is also provided.

Figure 2:
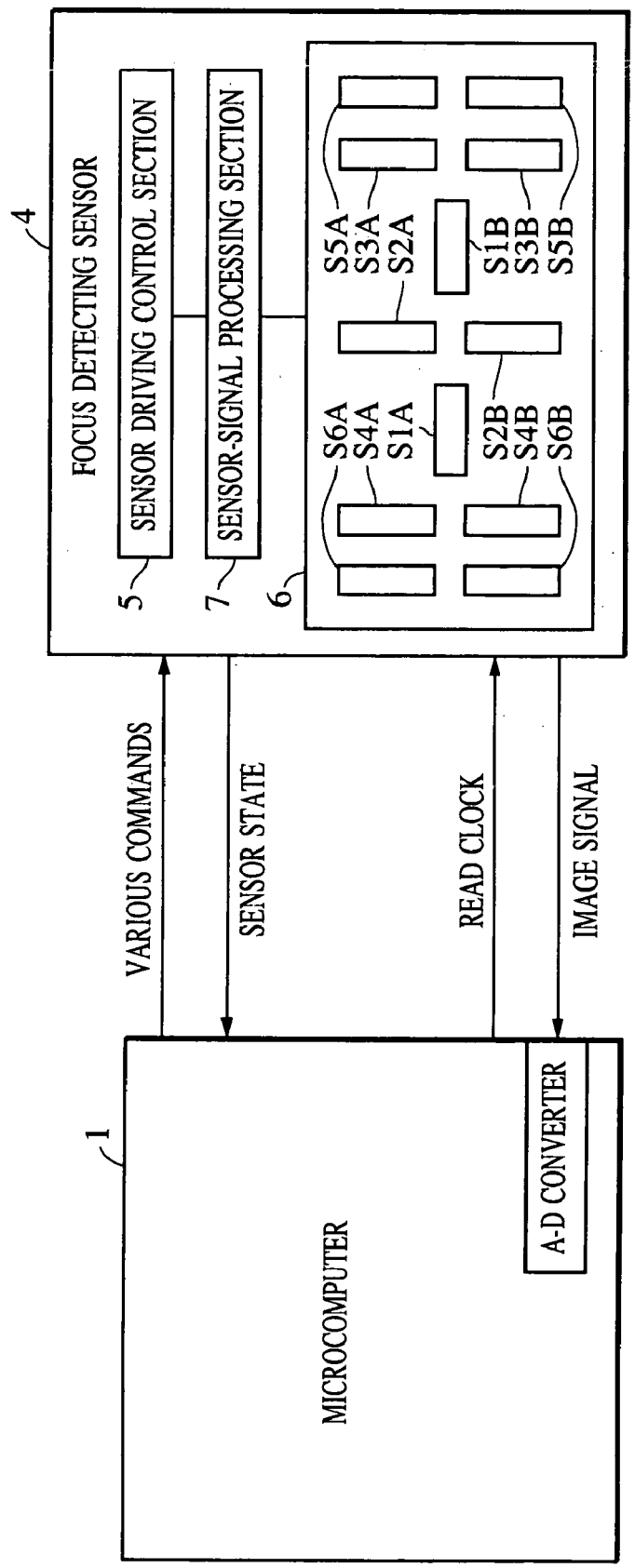
FIG. 2 is a schematic view showing communication between a microcomputer and a focus detecting sensor shown in FIG. 1.

FIG. 2 is a schematic view showing the relationship between the microcomputer 1 and the focus detecting sensor 4 shown in FIG. 1.

The microcomputer 1 sends various commands to the focus detecting sensor 4 to control the sensor cell blocks. The focus detecting sensor 4 sends back to the microcomputer 1 signals representing the state of the focus detecting sensor 4. According to a read-clock signal sent from the microcomputer 1, the focus detecting sensor 4 processes a signal accumulated by the sensor section 6 by the sensor-signal processing section 7 and sends the result as an analog image signal to an A–D converter (not shown) in the microcomputer 1.

Figure 3:
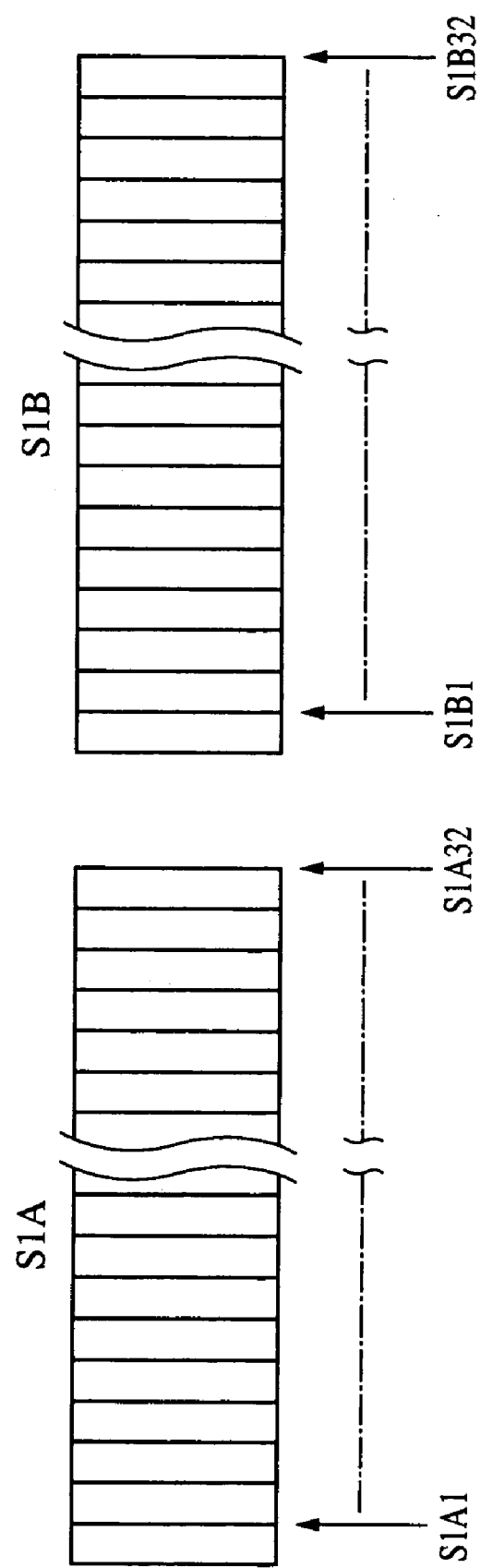
FIG. 3 is a schematic view of sensor cell units included in the focus detecting sensor shown in FIG. 1.

FIG. 3 is a schematic view showing a detailed structure of the sensor cell blocks in the sensor section 6 by taking the pair of sensor cell blocks S1A and S1B as an example.

The sensor cell blocks S1A and S1B in the sensor section 6 are aligned horizontally to detect the focus by a known phase-difference method. The sensor cell block S1A is formed of a total of 32 sensor cell units S1A1 to S1A32, and the sensor cell block S1B is formed of a total of 32 sensor cell units S1B1 to S1B32. The other sensor pairs in the sensor section 6 have the same structure.

Figure 4:
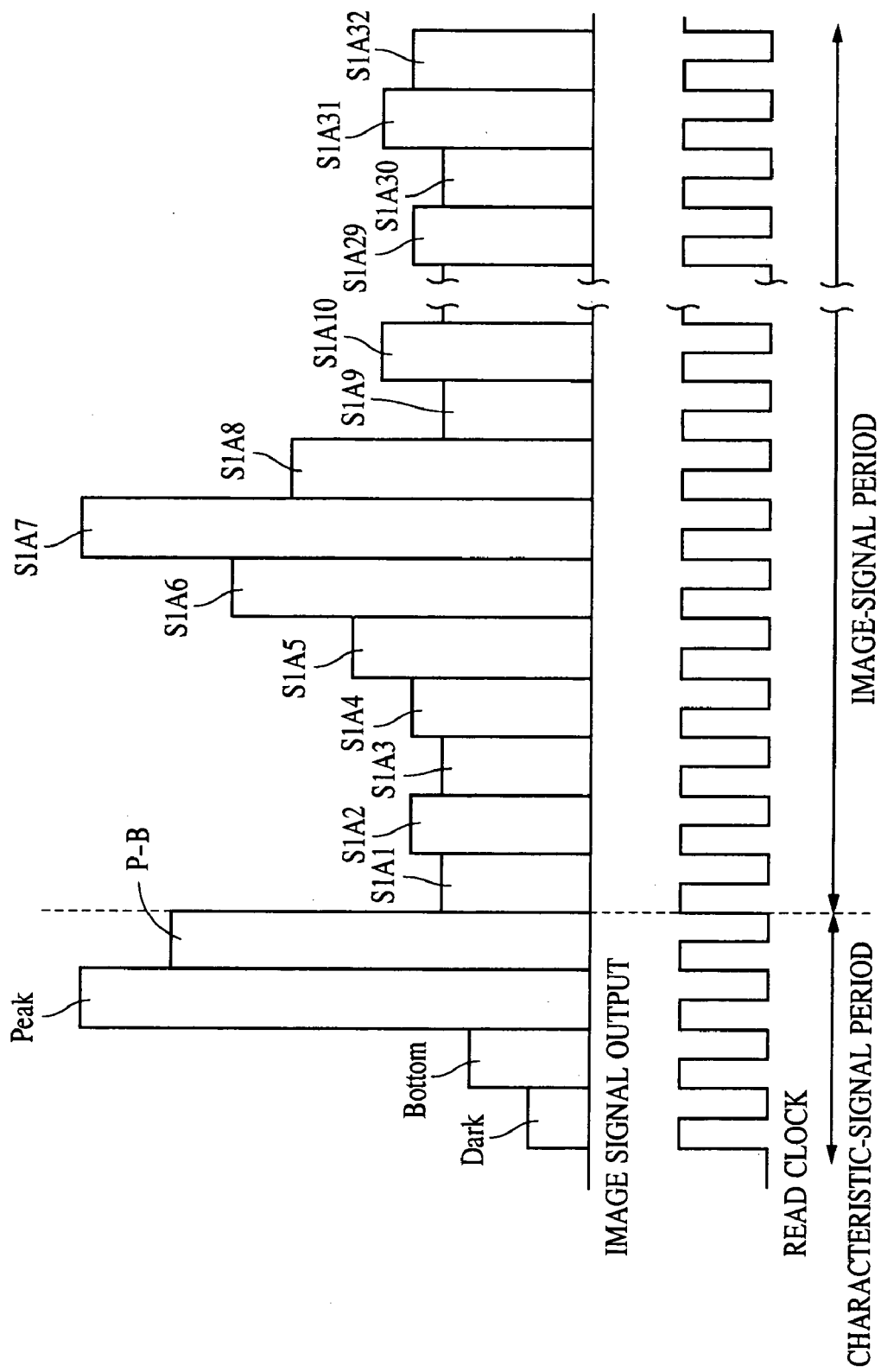
FIG. 4 is a schematic view of a signal output from the focus detecting sensor shown in FIG. 1.

FIG. 4 is a view showing an analog signal output from the focus detecting sensor 4. The focus detecting sensor 4 outputs an image signal according to the read-clock signal output from the microcomputer 1. Among the six line pairs of sensor cell blocks in the sensor section 6, the sensor line formed of the pair of sensor cell blocks S1A and S1B will be taken as an example.

The output image signal has a characteristic-signal period showing the characteristics of the image signal and an image-signal period showing the image signal component corresponding to each sensor cell. In the characteristic-signal period, a Dark signal, which indicates a signal output from a light-shielded sensor cell; a Bottom signal, which indicates the minimum output signal component among those output from the sensor cell units S1A1 to S1B32; a Peak signal, which indicates the maximum output signal component among those output from the sensor cell units S1A1 to S1B32; and a P-B signal, which indicates the image contrast by the difference between the Peak signal and the Bottom signal are output in that order. In the image-signal period, the output signal components of the sensor cell units S1A1 to S1B32 are shown. Signals are output in the same order in the other sensor lines.

With the above structure, a focus detecting operation is performed at a plurality of AF areas by the known passive method.

Figure 5:
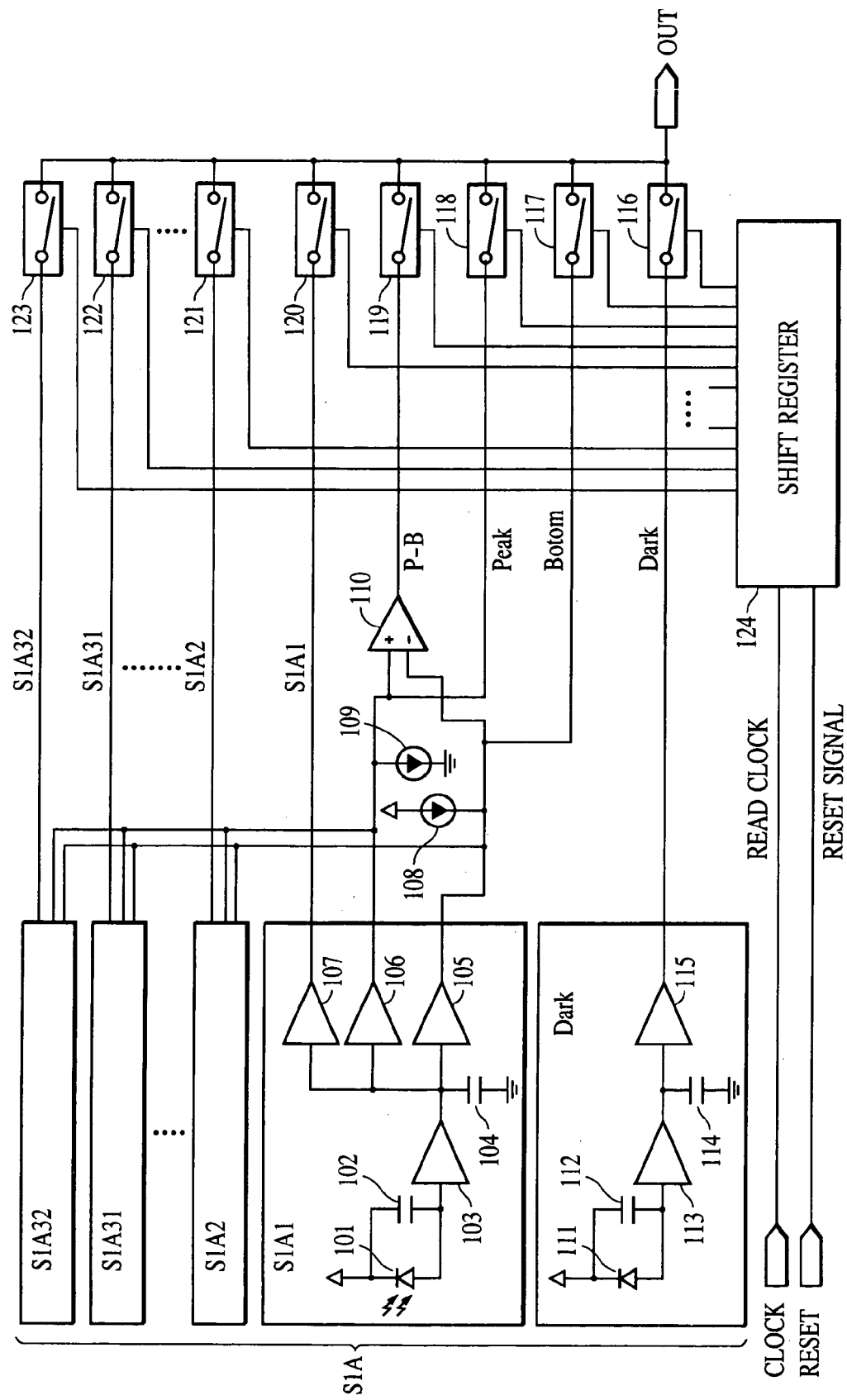
FIG. 5 is a block diagram showing a detailed internal structure of the focus detection sensor shown in FIG. 1.

How the focus detecting sensor 4 obtains an image signal and the characteristic signals (the Dark, Bottom, Peak, and P-B signals) showing the characteristics of the image signal and how the microcomputer 1 reads them will be described below in detail by referring to FIG. 5. FIG. 5 is a block diagram of a part of the sensor section 6 and the sensor-signal processing section 7 shown in FIG. 2.

The sensor cell unit S1A1 is formed of a photodiode 101 serving as a photoelectric conversion device constituting the sensor cell unit S1A1, a capacitor 102 serving as charge accumulation means connected in parallel to the photodiode 101, a buffer amplifier 103 connected to the output of the sensor cell formed of the photodiode 101 and the capacitor 102, a memory capacitor 104 connected to the output of the buffer amplifier 103 and storing the signal of the sensor cell, a Bottom-signal buffer amplifier 105 for outputting a signal to a Bottom-signal detecting circuit, a Peak-signal buffer amplifier 106 for outputting a signal to a Peak-signal detecting circuit, and an image-signal buffer amplifier 107 for outputting the signal of the sensor cell as an image signal.

The sensor cell units S1A2 to S1A32 are formed in the same way and the sensor cell units S1A1 to S1A32 constitute the sensor cell block S1A. The output of the Bottom-signal buffer amplifier of each sensor cell unit are connected to each other. The output of the Peak-signal buffer amplifier of each sensor cell unit are also connected to each other.

A constant-current source 108 is connected to the outputs of the Bottom-signal buffer amplifiers of the sensor cell units S1A1 to S1A32 constituting the sensor cell block S1A. Current flows from the source to the outputs of the Bottom-signal buffer amplifiers. A constant-current source 109 is connected to the outputs of the Peak-signal buffer amplifiers of the sensor cell units S1A1 to S1A32 constituting the sensor cell block S1A. Current flows from the outputs of the Peak-signal buffer amplifiers to the ground.

With this structure, the minimum signal among the outputs of the Bottom-signal buffer amplifiers is output as the Bottom signal, and the maximum signal among the outputs of the Peak-signal buffer amplifiers is output as the Peak signal.

An operational amplifier 110 has an inverted input connected to the outputs of the Bottom-signal buffer amplifiers and has a non-inverted input connected to the outputs of the Peak-signal buffer amplifiers. The operational amplifier 110 outputs the P-B signal, which indicates the difference between the Peak signal and the Bottom signal.

A sensor cell unit Dark is formed of a photodiode 111 serving as a photoelectric conversion device constituting a sensor cell unit Dark, a capacitor 112 serving as charge accumulation means connected in parallel to the photodiode 111, a buffer amplifier 113 connected to the output of the sensor cell formed of the photodiode 111 and the capacitor 112, a memory capacitor 114 connected to the output of the buffer amplifier 113 and storing the signal of the sensor cell, and a Dark-signal buffer amplifier 115 for outputting the signal of the sensor cell as a Dark signal.

There are also provided in the sensor signal processing section 7 a switch circuit 116 connected to the output of the Dark-signal buffer amplifier 115, a switch circuit 117 connected to the outputs of the Bottom-signal buffer amplifiers of the sensor cells, a switch circuit 118 connected to the outputs of the Peak-signal buffer amplifiers of the sensor cells, a switch circuit 119 connected to the output of the P-B signal operational amplifier 110, and switch circuits 120 to

123 connected to the outputs of the image-signal buffer amplifiers of the sensor cell units S1A2, S1A31, and S1A32, respectively. Switch circuits comparable to switch circuits 116–119 are provided in the sensor signal processing section 7 for each of sensor cell units S1A2–S1A32. A shift register 124 receives a reset signal and the clock signal from the sensor driving control section 5, and turns on the switch circuits 116 to 123 one by one according to the clock signal.

With the above structure, when the microcomputer 1 inputs the read-clock signal through the sensor driving control section 5, the focus detecting sensor 4 outputs a Dark signal, a Bottom signal, a Peak signal, a P-B signal, and an image signal in that order. As described later, the P-B signal is used to select an AF area from which an image signal is read. The image signal is used to detect the focus.

Figure 6A:
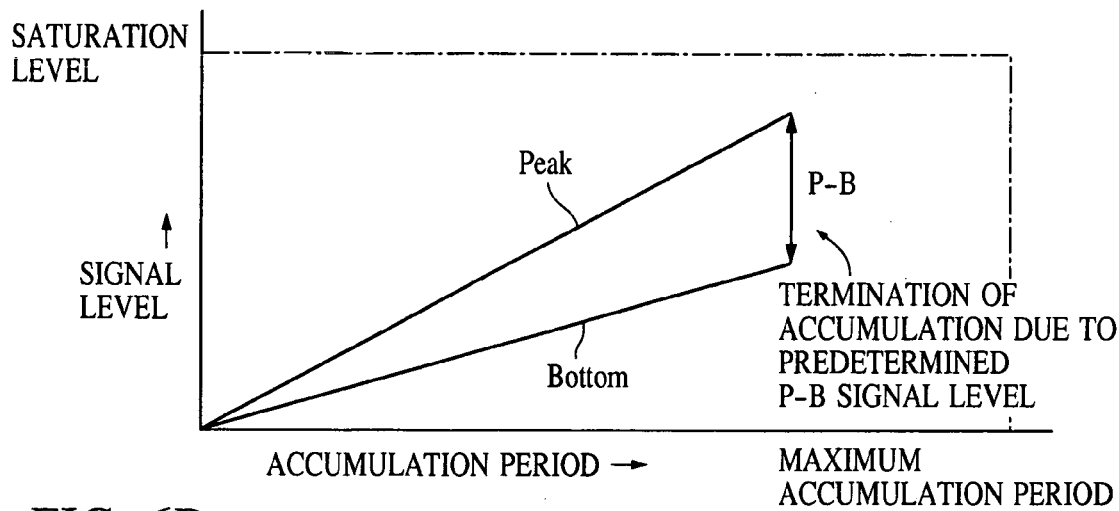
FIGS. 6A, 6B, and 6C are graphs showing accumulation conditions in the focus detecting sensor shown in FIG. 1.
Figure 6B:
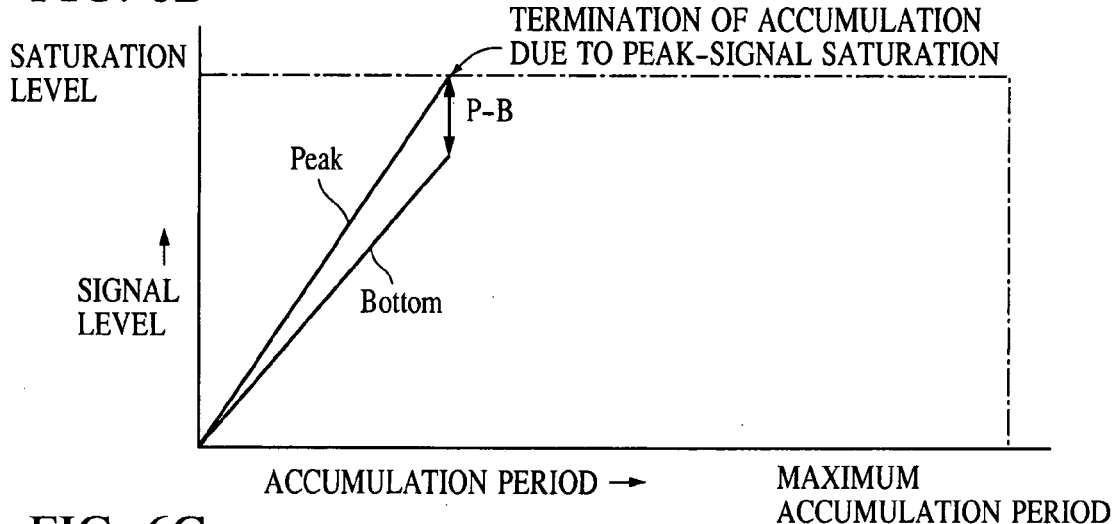
Figure 6C:
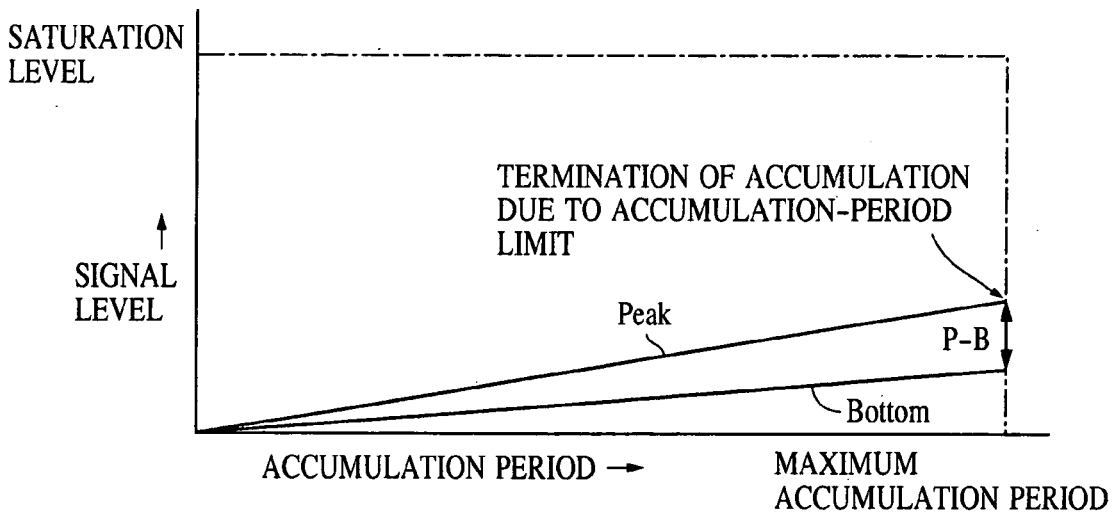

FIGS. 6A to 6C are graphs showing states of a signal accumulated in a sensor cell block line. FIG. 6A illustrates a case in which accumulation is terminated when the P-B signal reaches a predetermined level. FIG. 6B illustrates a case in which accumulation is terminated when the Peak signal reaches a predetermined value, in order to prevent the Peak signal from being saturated if an object has a high luminance. FIG. 6C shows a case in which accumulation is terminated at a predetermined time since an object has a low luminance.

When accumulation is terminated under conditions other than that in which the P-B signal reaches a predetermined level, an output image signal may have too small an amplitude to be used for focus detection.

Figure 7:
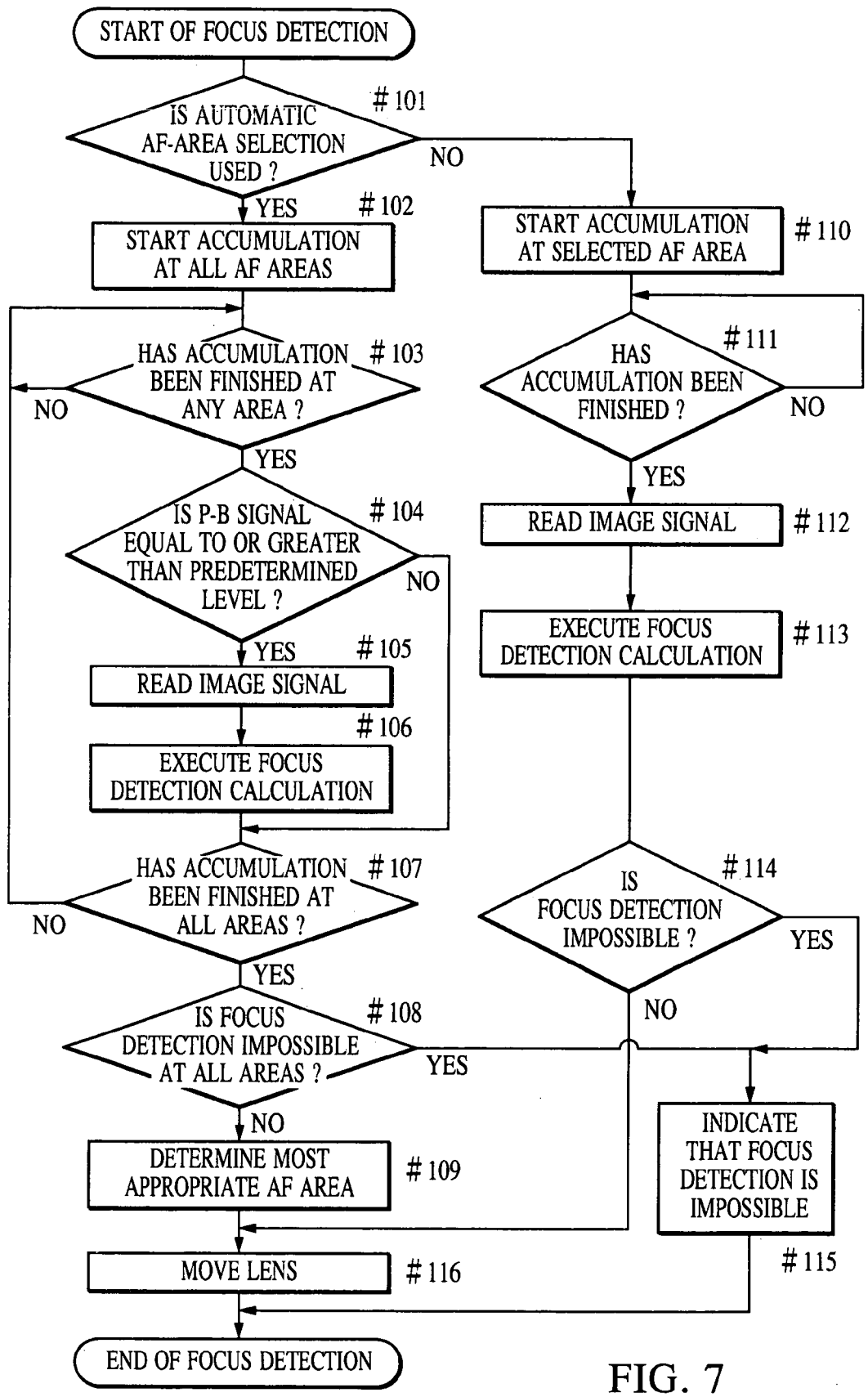
FIG. 7 is a flowchart showing the operations of the microcomputer, according to a first embodiment of the present invention.

FIG. 7 is a flowchart of a focus detecting operation in the microcomputer 1. When the switch SW1, used to start detecting the focus of the camera, is turned on, the operation starts from a step #101.

In the step #101, a method for selecting one AF area among a plurality of AF areas is chosen. The two methods are the automatic selection of the camera and the operator's manual selection. When the AF-area automatic selection is selected, the procedure proceeds to a step #102. When the AF-area automatic selection is not selected, the procedure proceeds to a step #110. In the step #102, the microcomputer 1 communicates with the focus detecting sensor 4 to start signal accumulation operations at all AF areas, and then, the next step #103, the microcomputer 1 determines whether an accumulation operation has been finished at any one area among the plurality of AF areas provided for the focus detecting sensor 4. When an accumulation operation has been finished at an AF area, the procedure proceeds to a step #104. If an accumulation operation has not yet been finished at any area, the procedure returns to the step #103 and the microcomputer 1 awaits termination of an accumulation operation.

In the step #104, the AF area where accumulation has been finished is determined by the focus detecting sensor 4, the microcomputer 1 sends a signal instructing reading of a signal from the corresponding sensor block line(s) in this AF area of the focus detecting sensor 4, the microcomputer 1 reads a characteristic signal (only at the characteristic-signal period shown in FIG. 4) from the image signal of the sensor block line(s) in the AF area, and the microcomputer 1 determines whether the P-B signal included therein is equal to or larger than a predetermined level. When the P-B signal is equal to or larger than the predetermined level, the microcomputer 1 determines that the image signal has a sufficient contrast and can be used for a focus-detection calculation, and the procedure proceeds to a step #105. If the P-B signal is less than the predetermined level, the procedure proceeds to a step #107.

In the step #105, since it has been determined in the step #104 that the image signal has a sufficient contrast at the sensor line at the area where accumulation was finished, the microcomputer 1 reads the image signal (at the image-signal period shown in FIG. 4), and in the next step #106, the microcomputer 1 executes a focus detection calculation by a known calculation method by the use of the image signal read in the step #105 and the method proceeds to step #107. In the following step #107, the microcomputer 1 determines whether accumulation has been finished in all sensor lines in the plurality of AF areas. When the accumulation has been finished, the procedure proceeds to a step #108. If the accumulation has not yet been finished in an area, the procedure returns to the step #103.

In the step #108, when the microcomputer 1 determines that it is impossible to detect the focus in all of the plurality of AF areas, the procedure proceeds to a step #115, described later. When the focus is detected at at least one AF area, the procedure proceeds to a step #109. In the step #109, when focus detection has been executed at a plurality of AF areas, the microcomputer 1 determines from the focus position and the characteristics of the image signal which AF area is to be used, and the procedure proceeds to a step #116.

When the AF-area automatic selection is not selected in step #101, the procedure proceeds from the step #101 to the step #110, as described above. Since the operator has manually selected an AF area, focus detection is executed only at the sensor block line(s) in the selected AF area. As a result, in step #110 the microcomputer 1 sends an instruction to the focus detecting sensor 4 to start an accumulation operation only at the sensor block line(s) in the selected area. In the next step #111, the microcomputer 1 determines whether the accumulation operation at the sensor block line(s) has been finished. When the accumulation operation has been finished, the procedure proceeds to a step #112. If the accumulation operation has not yet been finished, the procedure returns to the step #111 and the microcomputer 1 awaits the termination of the accumulation operation.

In the step #112, the microcomputer 1 reads the image signal (at all periods). In the next step #113, the microcomputer 1 executes a focus detection calculation according to the image signal read in the step #112. In the following step #114, the microcomputer 1 determines whether the focus is detected by the focus detection calculation performed in the step #113. If focus detection cannot be performed for some reason, such as a low-contrast image signal, the procedure proceeds to a step #115. When focus detection has been executed, the procedure proceeds to a step #116. In the step #115, since focus detection cannot be executed, an indication showing that focus detection cannot be executed is displayed on the display section 12 through the display circuit 11 and the focus detection operation is terminated.

In the step #116, a focus lens in the interchangeable lens 10 is moved by the lens control circuit 7 to the focus position detected by the focus detection calculation, and the focus detection operation is terminated.

In the steps #103 and #111, the termination of accumulation may be determined by the microcomputer 1 when the integrated output of a sensor for monitoring, provided separately from the focus detecting sensor 4, reaches a predetermined value. Alternatively, the termination of accumulation may be determined by the microcomputer 1 when the P-B signal or the Peak signal from a sensor cell reaches a predetermined level.

As described above, according to the first embodiment, since the image signal of the sensor block line(s) in an AF area where a P-B signal less than the predetermined level is obtained among a plurality of AF areas has a low contrast and is not used, neither the image signal is read nor a focus detection calculation is performed (the procedure jumps from the step #104 to the step #107).

In the foregoing description, the microcomputer 1 determines from the P-B signal whether the image signal is to be read. The procedure may be modified such that the Peak signal and the Bottom signal are read, the difference therebetween is calculated, and according to the calculation result, whether the image signal is to be read and a focus detection calculation is to be performed are determined by the microcomputer 1.

Thus, the invention relates to a focusing-information detecting apparatus for executing a focusing calculation according to an image signal sent from a sensor block formed of a plurality of cell units which accumulate image signal components. And the microprocessor 1, therefore, comprises a characteristic determination circuit for reading a signal from a first set of the plurality of cell units in the sensor block and for determining the characteristics of the corresponding image signal, as shown in the step #104. The microprocessor 1, therefore also comprises a reading processing circuit for applying signal reading processing at least to other cell units not included in the first set in the sensor block when the determination result obtained by the characteristic determination circuit is a predetermined result, and for disabling signal reading processing at least for the other cell units in the sensor block when the determination result obtained by the characteristic determination circuit is another predetermined result, which is different from the predetermined result, as shown in the step #105.

In addition, the apparatus, therefore, also relates to a detecting apparatus for detecting a focus state or distance information (since the invention is equally applicable to detecting such distance information) according to an image signal accumulated by each of image-signal accumulation sensor blocks corresponding to a plurality of focus or distance detection areas. The microcomputer 1, therefore, comprises a reading circuit for reading, every time an operation for accumulating image signal components is finished in a sensor block, the image signal from the sensor block where the accumulation operation has been finished, as shown in the step #103. The microcomputer, therefore, also comprises a reading control circuit for executing, during the reading operation, a first reading processing operation for reading the characteristic signal of the image signal in a sensor block to which the reading operation is applied as shown in the step #103, and for executing a second reading processing operation for reading the image signal from the sensor block whose characteristic signal was subject to the first reading processing operation after the first reading processing operation, as shown in the step #105. In addition, the microcomputer also comprises a determination circuit for evaluating the characteristic signal read in the first reading processing operation and for determining whether the second reading processing is executed, as shown in the step #104. Further, the microcomputer 1, therefore, includes a circuit for detecting the focus state or distance information according to an image signal accumulated by each of image-signal accumulation sensor blocks corresponding to a plurality of focus or distance detection areas, and according to the image signal reading performed by the reading circuit, as shown in the step #104.

Further, the apparatus, therefore, also relates to a detecting apparatus for calculating focus detection information or distance information according to an image signal accumulated in each of image-signal accumulation sensor blocks corresponding to a plurality of focus or distance detection areas. The microcomputer 1, therefore, comprises a first output circuit for outputting the characteristic signal of a photoelectrically converted image signal in each focus or distance detection area, as shown in the step #104, a second output circuit for outputting the photoelectrically converted image signal in each focus or distance detection area, as shown in the step #105, a first signal reading circuit for reading the characteristic signal from the first output circuit, as shown in the step #104, a second signal reading circuit for reading the image signal from the second output circuit, as shown in the step #105, and a reading control circuit for comparing the level of the characteristic signal read by the first signal reading circuit with a determination level determined in advance, for controlling the second signal reading circuit to read the image signal in a focus or distance detection area where the level of the characteristic signal has a first relationship with the determination level, and for disabling reading of the image signal by the second signal reading circuit in a focus or distance detection area where the level of the characteristic signal has a second relationship with the determination level, as shown in the step #104. In addition, the microcomputer 1 comprises a focus calculating circuit for calculating focus detection information or distance information according to an image signal accumulated in each of image-signal accumulation sensor blocks corresponding to a plurality of focus or distance detection areas, as shown in the step #106.

The microcomputer 1, therefore, also comprises a determination-level changing circuit for determining whether focus or distance detection has succeeded in a focus or distance detection area among the plurality of focus or distance detection areas, and, when focus or distance detection has succeeded in a focus or distance detection area, for changing the determination level according to the level of a characteristic signal in the focus or distance detection area, as shown in the step #208. The microcomputer 1, therefore, also comprises a level changing circuit for determining whether focus or distance detection has succeeded in a focus or distance detection area among the plurality of focus or distance detection areas, and for changing the determination level between a case in which focus or distance detection has succeeded in a focus or distance detection area and a case in which it has not succeeded, as shown in the step #208. The microcomputer 1, therefore, also comprises a determination circuit for determining whether focus or distance detection has already succeeded in a focus or distance detection area among the plurality of focus or distance detection areas, and, only when focus or distance detection has succeeded in a focus or distance detection area, for determining whether reading is performed at the determination level, as shown in the step #207.

The microcomputer 1, therefore, also comprises a reading control circuit for reading the difference output from a difference output section through a signal reading section, for reading the image signal output from the image-signal output section through the signal reading section in a focus or distance detection area where the difference is greater than a predetermined value, and for disabling reading of the image signal in a focus or distance detection area where the difference is smaller than the predetermined value, as shown in the step #104. In addition, the microcomputer 1, therefore, comprises a calculation circuit for calculating focus or distance detection information according to the read image signal, as shown in the step #106.

The microcomputer 1, therefore, comprises a reading control circuit for reading the maximum value and the minimum value of the image signal through a signal reading section, for calculating the difference therebetween, for reading the image signal through the signal reading section in a focus or distance detection area where the difference is greater than a predetermined value, and for disabling reading of the image signal in a focus or distance detection area where the difference is smaller than the predetermined value, as shown in the step #104. In addition, the microcomputer, therefore, comprises a calculation circuit for calculating focus or distance detection information according to the read image signal, as shown in the step #106.

The apparatus, therefore, relates to a focusing-information detecting apparatus having a plurality of sensor blocks each formed of a plurality of cell units which accumulate image signal components, for executing, every time an operation for accumulating image signal components is finished in a sensor block, a focusing calculation according to an image signal read from the sensor block where the accumulation operation has been finished. The microcomputer 1, therefore, comprises a characteristic determination circuit for reading a signal from a first set of cell units in a sensor block where accumulation has been finished and for determining the characteristics of the corresponding image signal, as shown in the step #104. The microcomputer 1 also therefore, comprises a reading processing circuit for applying signal reading processing at least to the other cell units not included in the first set of cell units in the sensor block when the determination result obtained by the characteristic determination circuit is a predetermined result, and for disabling signal reading processing at least for the other cell units in the sensor block when the determination result obtained by the characteristic determination circuit is another predetermined result, which is different from the predetermined result, as shown in the step #104. The microcomputer 1, therefore, also comprises means for executing, every time an operation for accumulating image signal components is finished in a sensor block, a focusing calculation according to an image signal read from the sensor block where the accumulation operation has been finished and in accordance with the reading and determining by the characteristic determination circuit and the reading signal processing performed by the reading processing circuit, as shown in the step #106.

Second Embodiment

A second embodiment of the present invention will be described below. The electrical structure of a camera and the determination of the termination of accumulation are the same as in the first embodiment.

In the second embodiment of the present invention, a P-B signal has a plurality of determination (threshold) levels used by the microcomputer 1 for determining whether both reading of an image signal and executing of a focus detection calculation are performed. One of the threshold levels is selected according to existing conditions. A case in which two threshold levels, a lower level Low and a higher level High, are used for a P-B signal will be taken as an example.

The lower threshold level Low is used when an image signal has a lower contrast than in cases when the threshold level High is used.

Figure 8:
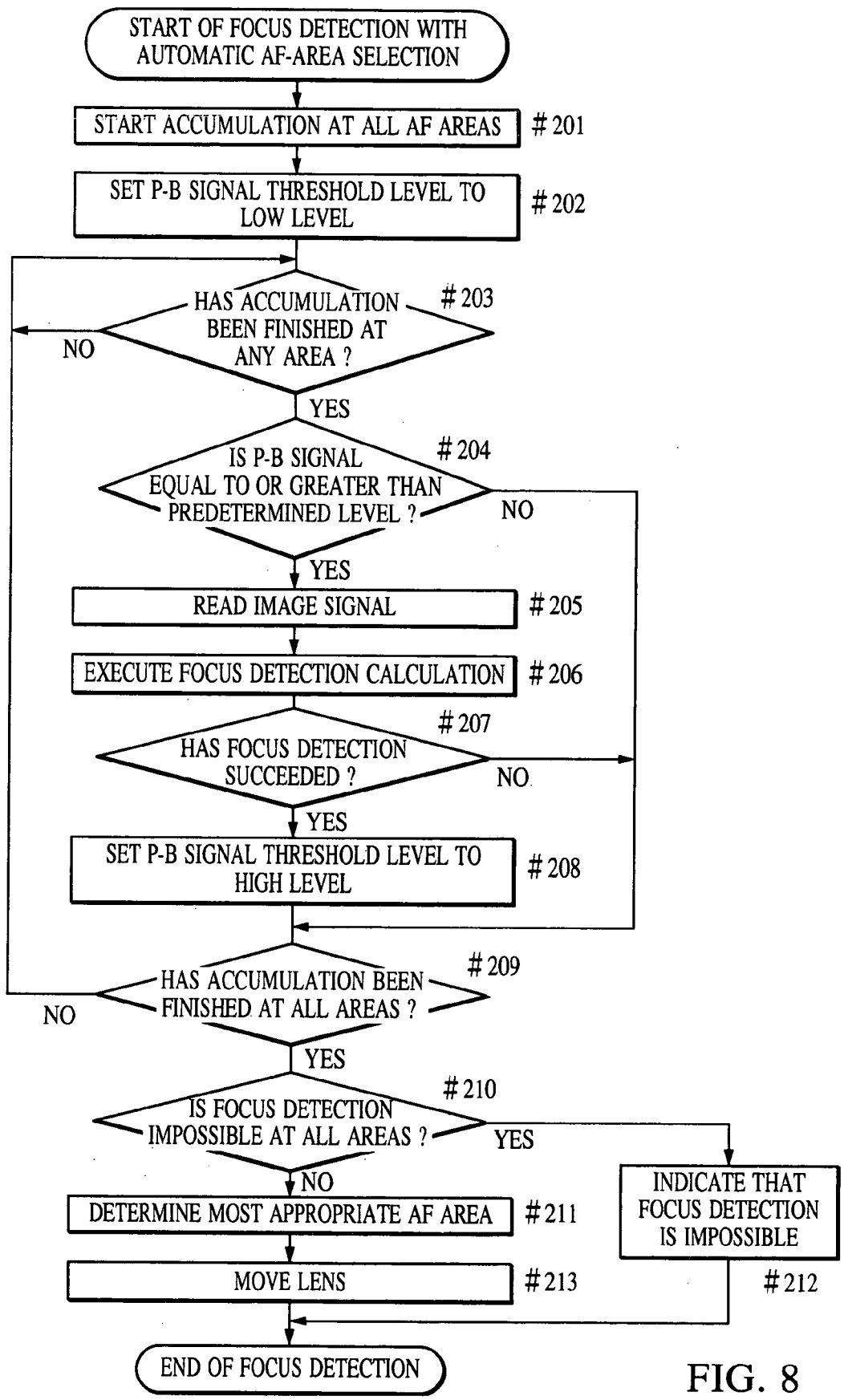
FIG. 8 is a flowchart showing the operations of the microcomputer, according to a second embodiment of the present invention.

FIG. 8 is a flowchart of operations in a case in which AF areas are automatically selected and focus detection is performed, among the operations of the microcomputer 1, according to the second embodiment of the present invention. When the switch SW1, used to start detecting the focus of the camera, is turned on, the operations start from a step #201.

In the step #201, the microcomputer 1 communicates with the focus detecting sensor 4 to start signal accumulation operations at all AF areas. In the next step #202, a threshold level for the P-B signal is set to Low. In the following step #203, the microcomputer determines whether an accumulation operation has been finished at any one area among the plurality of AF areas provided for the focus detecting sensor 4. When an accumulation operation has been finished at an AF area, the procedure proceeds to a step #204. If an accumulation operation has not yet been finished at any area, the procedure returns to the step #203 and the microcomputer 1 awaits termination of an accumulation operation.

In the step #204, the microcomputer 1 reads the characteristic signal included in the image signal of the AF area where accumulation has been terminated from the focus detection sensor 4, and determines whether the P-B signal included therein is equal to or greater than the threshold level. When the P-B signal is equal to or greater than the threshold level, the microcomputer 1 determines that the image signal has a sufficient contrast and can be used for a focus-detection calculation, and the procedure proceeds to a step #205. If the P-B signal is less than the threshold level, the procedure proceeds to a step #209.

In the step #205, since it has been determined in the step #204 that the image signal has a sufficient contrast at the sensor block line(s) in the area where accumulation was finished, the microcomputer 1 reads the image signal. In the next step #206, the microcomputer 1 executes a focus detection calculation by a known calculation method by the use of the image signal read in the step #205. But in some cases, even when the image signal has a sufficient contrast, focus detection cannot be performed in the focus detection calculation due to the nature of the image signal. Therefore, in the following step #207, the microcomputer 1 determines whether focus detection has been achieved in the focus detection calculation executed in the step #206. When focus detection has been achieved, the procedure proceeds to a step #208. If focus detection has not been achieved, the procedure proceeds to the step #209.

In the step #208, the microcomputer 1 sets the threshold level for the P-B signal to High, and the procedure proceeds to the step #209. When the threshold level has already been set to High, the level is not changed. In the step #209, the microcomputer 1 determines whether accumulation has been finished in all of the plurality of AF areas. When the accumulation has been finished, the procedure proceeds to a step #210. If the accumulation has not yet been finished in an area, the procedure returns to the step #203.

In the step #210, when it is impossible to detect the focus in all of the plurality of AF areas, the procedure proceeds to a step #212. In the step #212, since focus detection cannot be executed, an indication showing that focus detection cannot be executed is displayed on the display section 12 and the focus detection operation is terminated. When the focus is detected at at least one AF area, the procedure proceeds from the step #210 to a step #211. In the step #211, when focus detection has been executed at a plurality of AF areas, the microcomputer 1 determines from the focus position and the characteristics of the image signal which AF area is to be used. The microcomputer 1 determines the most appropriate AF area, and the procedure proceeds to a step #213.

In the step #213, the focus lens is moved by the lens control circuit 7 to the focus position detected by the focus detection calculation, and the focus detection operation is terminated.

According to the second embodiment, until focus detection is achieved in at least one of the plurality of AF areas, the threshold level for the P-B signal, used for determining whether both reading of an image signal and executing a focus detection calculation are performed, is set to the lower level to read an image signal in an area where a contrast is low to some extent and to execute a focus detection calculation (in the steps #202 to #206); and when focus detection has been achieved at least in one of the AF areas, the threshold level for the P-B signal is set to the higher level (in the steps #207 to #208) to read only a high-contrast signal and execute a focus detection calculation.

Third Embodiment

A third embodiment of the present invention will be described below. The electrical structure of a camera and the determination of the termination of accumulation are the same as in the first embodiment.

In the third embodiment of the present invention, the P-B signal has a threshold level used for determining whether both reading of an image signal and executing of a focus detection calculation are performed, the threshold level being changed according to the P-B signal obtained at an AF area where focus detection is achieved. A case in which the threshold level is set to half the P-B signal obtained at an AF area where focus detection has been achieved will be taken as an example.

Figure 9:
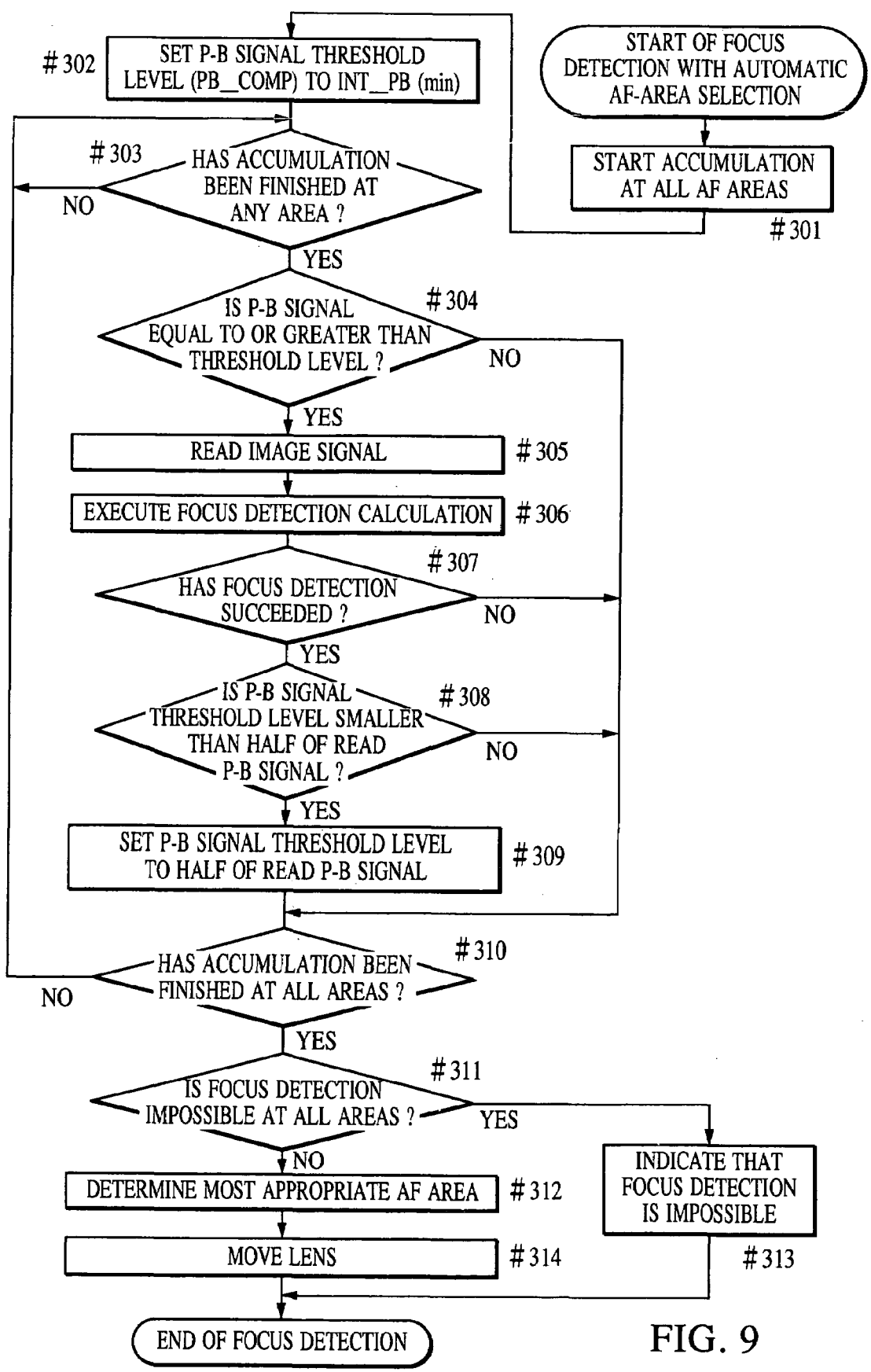
FIG. 9 is a flowchart showing the operations of the microcomputer, according to a third embodiment of the present invention.

FIG. 9 is a flowchart of operations in a case in which AF areas are automatically selected and focus detection is performed, among the operations of the microcomputer 1, according to the third embodiment of the present invention. When the switch SW1, used to start detecting the focus of the camera, is turned on, the operations start from a step #301.

In the step #301, the microcomputer 1 communicates with the focus detecting sensor 4 to start signal accumulation operations at all AF areas. In the next step #302, the microcomputer 1 sets a threshold level (PB_COMP) for the P-B signal to an initial value INT_PB(min). In the following step #303, the microcomputer 1 determines whether an accumulation operation has been finished at any one area among the plurality of AF areas provided for the focus detecting sensor 4. When an accumulation operation has been finished at an AF area, the procedure proceeds to a step #304. If an accumulation operation has not yet been finished at any area, the procedure returns to the step #303 and the microcomputer 1 awaits the termination of an accumulation operation.

In the step #304, the microcomputer 1 reads the characteristic signal included in the image signal of the AF area where accumulation has been terminated from the focus detection sensor 4, and determines whether the P-B signal (PB_Read) included therein is equal to or greater than the threshold level (PB_COMP). When the P-B signal is equal to or greater than the threshold level, the microcomputer 1 determines that the image signal has a sufficient contrast and can be used for a focus-detection calculation, and the procedure proceeds to a step #305. If the P-B signal is less than the threshold level, the procedure proceeds to a step #310.

In the step #305, since it has been determined in the step #304 that the image signal has a sufficient contrast at the sensor block line(s) in the area where accumulation was finished, the microcomputer 1 reads the image signal. In the next step #306, the microcomputer 1 executes a focus detection calculation by a known calculation method by the use of the image signal read in the step #305. But in some cases, even when the image signal has a sufficient contrast, focus detection cannot be performed in the focus detection calculation due to the nature of the image signal. Therefore, in the following step #307, the microcomputer 1 determines whether focus detection has been achieved in the focus detection calculation executed in the step #306. When focus detection has been achieved, the procedure proceeds to a step #308. If focus detection has not been achieved, the procedure proceeds to the step #310.

In the step #308, the microcomputer 1 determines whether the threshold level (PB_COMP) for the P-B signal is less than half the read P-B signal (PB_Read) obtained for the determination in the step #304. When the threshold level is less than the half, the procedure proceeds to a step #309. When the threshold level is not less than the half, the procedure proceeds to the step #310.

In the step #309, the microcomputer 1 sets the threshold level (PB_COMP) to half of the read P-B signal (PB_Read). In the next step #310, the microcomputer 1 determines whether accumulation has been finished in all of the plurality of AF areas. When the accumulation has been finished, the procedure proceeds to a step #311. If the accumulation has not yet been finished in an area, the procedure returns to the step #303.

In the step #311, the microcomputer 1 determines if it is impossible to detect the focus in all of the plurality of AF areas. If it is, the procedure proceeds to a step #313. In the step #313, an indication showing that focus detection cannot be executed is displayed on the display section 12 and the focus detection operation is terminated. When the microcomputer 1 determines that the focus is detected at least in one AF area in step #311, the procedure proceeds to the step #312. In the step #312, when focus detection has been executed at a plurality of AF areas, the microcomputer 1 determines from the focus position and the characteristics of the image signal which AF area is to be used, and determines the most appropriate AF area, and the procedure proceeds to a step #314.

In the step #314, the focus lens is moved by the lens control circuit 7 to the focus position detected by the focus detection calculation, and the focus detection operation is terminated.

According to the third embodiment, until focus detection is achieved at least at one of the plurality of AF areas, the threshold level for the P-B signal, used for determining whether both reading of an image signal and executing a focus detection calculation are performed, is set to the initial value (INT_PB(min)), which is the minimum value, to read an image signal in an area where contrast is low to some extent and to execute a focus detection calculation (in the steps #302 to #306); and when focus detection has been achieved at least in one of the AF areas, the threshold level (PB_COMP) for the P-B signal is set according to the read P-B signal read therein (in the step #309) to read only a high-contrast signal and execute a focus detection calculation.

Fourth Embodiment

A fourth embodiment of the present invention will be described below. The electrical structure of a camera and the determination of the termination of accumulation are the same as in the first embodiment.

In the fourth embodiment of the present invention, only when focus detection has been achieved at an area, the microcomputer 1 determines whether both reading of an image signal and executing of focus detection calculation are performed.

Figure 10:
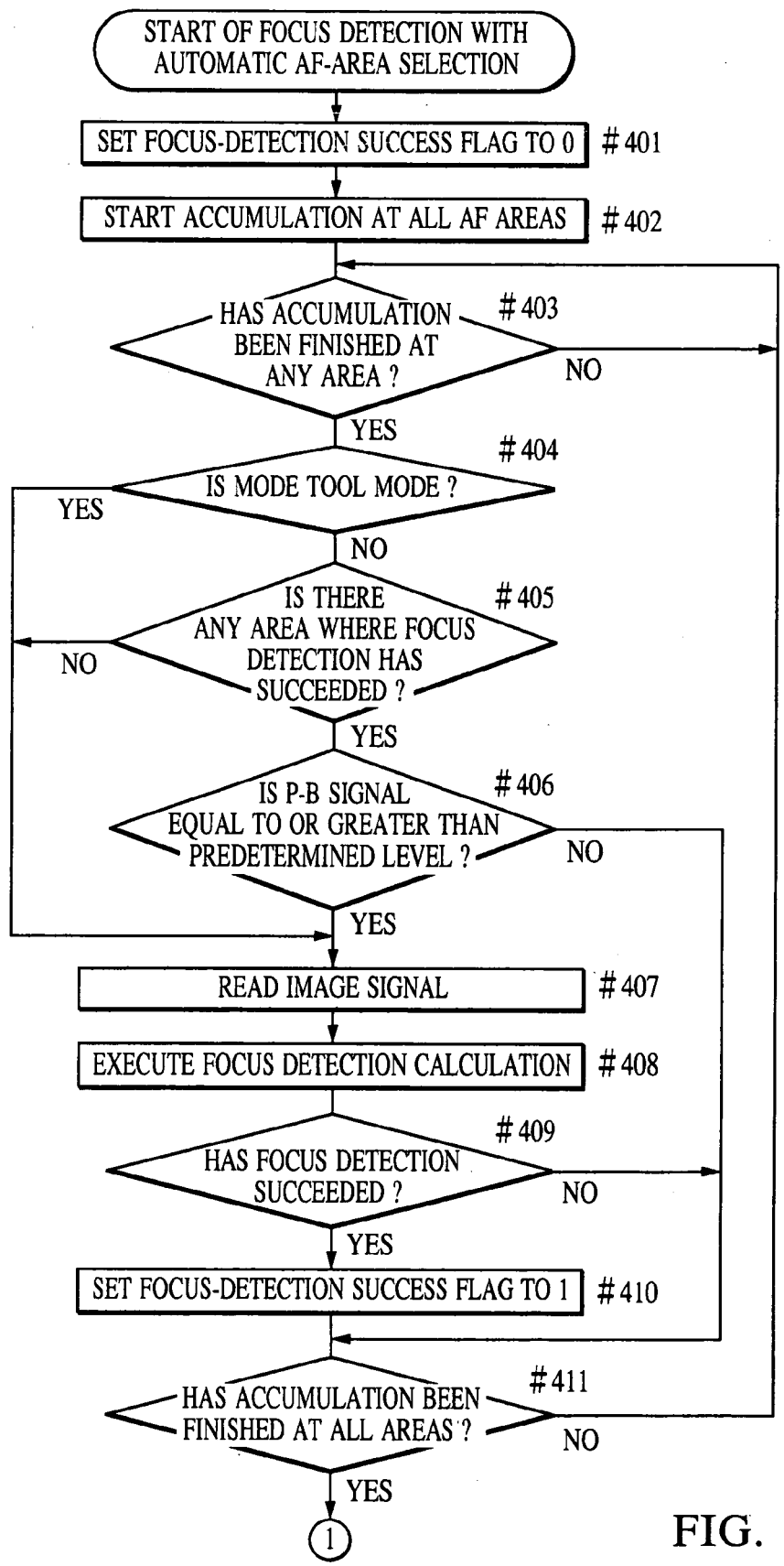
FIG. 10 is a flowchart showing a part of operations of the microcomputer, according to a fourth embodiment of the present invention.
Figure 11:
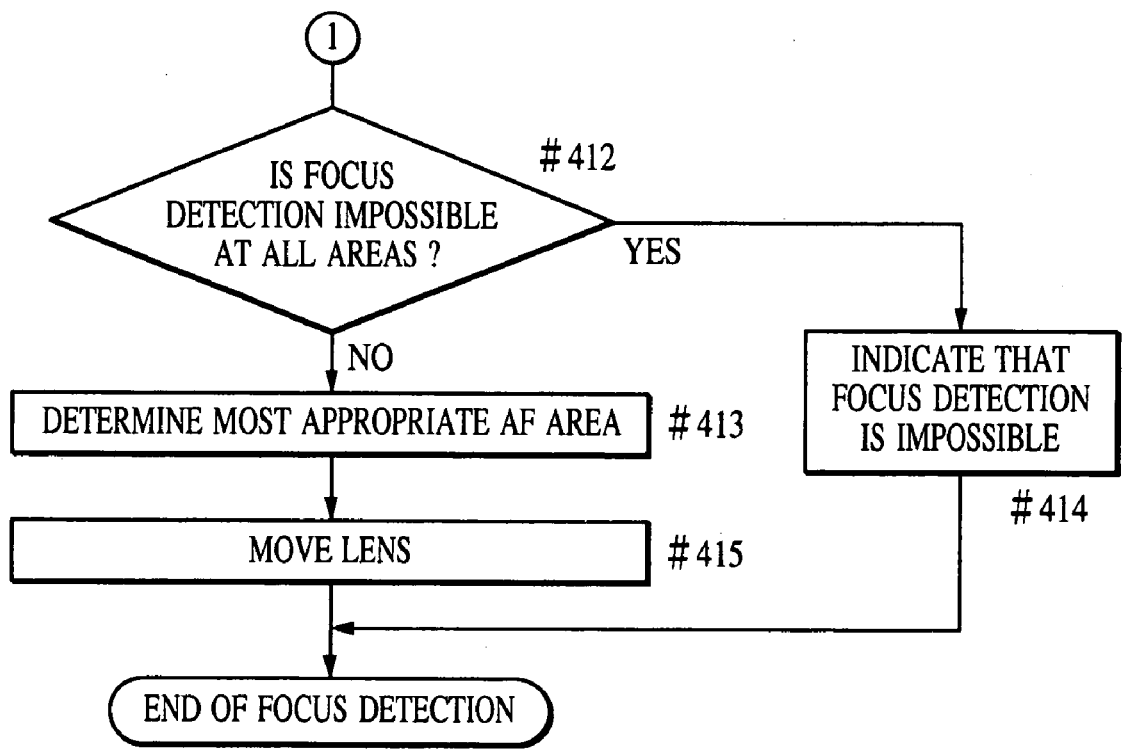
FIG. 11 is a flowchart showing the operations following those shown in FIG. 10.

FIGS. 10 and 11 together comprise a flowchart of operations in a case in which AF areas are automatically selected and focus detection is performed, among the operations of the microcomputer 1, according to the fourth embodiment of the present invention. When the switch SW1, used to start detecting the focus of the camera, is turned on, the operations start from a step #401.

In the step #401, the microcomputer 1 sets a focus-detection success flag stored in the RAM 2 to zero. In the next step #402, the microcomputer 1 communicates with the focus detecting sensor 4 to start signal accumulation operations at all AF areas. In the following step #403, the microcomputer 1 determines whether an accumulation operation has been finished at any one area among the plurality of AF areas provided for the focus detecting sensor 4. When an accumulation operation has been finished at an AF area, the procedure proceeds to a step #404. If an accumulation operation has not yet been finished at any area, the procedure returns to the step #403 and the microcomputer 1 awaits the termination of an accumulation operation.

In the step #404, the microcomputer 1 determines whether the current mode is a tool mode, which is used for adjusting or checking the camera in a manufacturing process or for repair. When the current mode is the tool mode, the procedure proceeds to a step #407 because signals need to be read from all AF areas. When the current mode is not the tool mode, the procedure proceeds to a step #405.

In the step #405, the microcomputer 1 determines from the state of the focus detection success flag whether focus detection has succeeded in an area. When focus detection has succeeded in an area, the procedure proceeds to a step #406. If focus detection has succeeded in no area, the procedure proceeds to the step #407. In the step #406, the microcomputer 1 reads the characteristic signal included in the image signal of the AF area where accumulation has been terminated from the focus detection sensor 4, and determines whether the P-B signal included therein is equal to or greater than a predetermined level. When the P-B signal is equal to or greater than the predetermined level, the microcomputer 1 determines that the image signal has a sufficient contrast and can be used for a focus-detection calculation, and the procedure proceeds to the step #407. If the P-B signal is less than the predetermined level, the procedure proceeds to a step #411.

In the step #407, the microcomputer 1 reads the image signal corresponding to the area where accumulation has been finished. In the next step #408, the microcomputer 1 executes a focus detection calculation by a known calculation method by the use of the image signal read in the step #407. Since focus detection cannot be performed in the focus detection calculation due to the nature of the image signal in some cases, the microcomputer 1 determines in the following step #409 whether focus detection has been successfully achieved in the focus detection calculation executed in the step #408. When focus detection has been successfully achieved, the procedure proceeds to a step #410. If focus detection has not successfully been achieved, the procedure proceeds to the step #411.

In the step #410, since it is determined in the step #409 that focus detection has been successfully achieved, the microcomputer 1 sets the focus-detection success flag stored in the RAM 2 to 1. When the focus-detection success flag has already been set to 1, it is not changed. In the next step #411, the microcomputer 1 determines whether accumulation has been finished in all of the plurality of AF areas. When the accumulation has been finished, the procedure proceeds to a step #412. If the accumulation has not yet been finished in an area, the procedure returns to the step #403.

In the step #412, shown in FIG. 11, the microcomputer determines if it is impossible to detect the focus in all of the plurality of AF areas. If so, the procedure proceeds to a step #414. In the step #414, an indication showing that focus detection cannot be executed is displayed on the display section 12 and the focus detection operation is terminated. When the microcomputer 1 detects the focus at least in one AF area, the procedure proceeds to a step #413. In the step #413, when focus detection has been executed at a plurality of AF areas, the microcomputer 1 determines from the focus position and the characteristics of the image signal which AF area is to be used, and determines the most appropriate AF area, and the procedure proceeds to a step #415.

In the step #415, the focus lens is moved by the lens control circuit 7 to the focus position detected by the focus detection calculation, and the focus detection operation is terminated.

According to the fourth embodiment, until focus detection is achieved at least in one of the plurality of AF areas, both reading of an image signal and executing a focus detection calculation are always performed (the procedure passes the steps #407 and #408); and when focus detection has been achieved at least in one of the AF areas, since the image signal obtained in an AF area where the P-B signal is less than the predetermined level among the other AF areas has a low contrast and the AF area is not used, neither the image signal is read nor a focus detection calculation is performed (the procedure passes the step #405, the step #406, and the step #411).

Modifications

In the above embodiments, focus detection is performed. The present invention can also be applied to a distance detection apparatus for detecting a distance.

In the above embodiments, a single-lens reflex camera has been described. The present invention can also be applied to other types of cameras and to equipment including focus detection apparatuses other than cameras.

What is claimed is:

1. A focusing apparatus for executing a focusing calculation according to an image signal from a sensor comprising a plurality of sensor blocks, each sensor block accumulating image signal components, said focusing apparatus comprising:

a control circuit for controlling an operation for accumulating image signal components in a sensor block of the plurality of sensor blocks;

a reading processing circuit for performing reading processing control for the sensor block; and a changing circuit for changing the reading processing control based on a result of determination of an accumulation condition for the sensor block, wherein, for each sensor block of the plurality of sensor blocks, every time the operation for accumulating image signal components in the sensor block is finished, said reading processing circuit performs the reading processing control and, if necessary, said changing circuit changes the reading processing control, wherein the reading processing control comprises allowing reading of an image signal from the sensor block in response to a P-B signal being greater than or equal to a threshold level and preventing reading of the image signal from the sensor block in response to the P-B signal being less than the threshold level, and wherein changing the reading processing control based on a result of determination of an accumulation condition for the sensor block comprises setting the threshold in accordance with the P-B signal.

* * * * *